United States Patent
Whang et al.

(10) Patent No.: US 6,659,500 B2
(45) Date of Patent: Dec. 9, 2003

(54) MULTI-CHAMBER INFLATOR

(75) Inventors: David S. Whang, Bloomfield Hills, MI (US); Eduardo L. Quioc, Westland, MI (US); Rickey L. Stratton, Pontiac, MI (US)

(73) Assignee: Automotive Systems Laboratory, Inc., Farmington Hills, MI (US)

(*) Notice: Subject to any disclaimer, the term of this patent is extended or adjusted under 35 U.S.C. 154(b) by 0 days.

(21) Appl. No.: 09/907,990

(22) Filed: Jul. 18, 2001

(65) Prior Publication Data

US 2002/0050703 A1 May 2, 2002

Related U.S. Application Data

(63) Continuation-in-part of application No. 09/568,719, filed on May 11, 2000, now Pat. No. 6,422,601.
(60) Provisional application No. 60/219,252, filed on Jul. 18, 2000.

(51) Int. Cl.$^7$ .............................................. B60R 21/28
(52) U.S. Cl. ......................................... 280/741; 280/736
(58) Field of Search ................................ 280/741, 736, 280/737; 102/530, 531

(56) References Cited

U.S. PATENT DOCUMENTS

| | | | |
|---|---|---|---|
| 4,530,516 A | 7/1985 | Adams et al. | 280/741 |
| 4,944,527 A | 7/1990 | Bishop et al. | 280/741 |
| 4,950,458 A | 8/1990 | Cunningham | 422/164 |
| 5,400,487 A | 3/1995 | Gioutsos et al. | 280/735 |
| 5,547,217 A | 8/1996 | Zelenak et al. | 280/741 |
| 5,558,367 A | 9/1996 | Cuevas | 280/737 |
| 5,564,743 A | 10/1996 | Marchant | 280/741 |
| 5,566,976 A | 10/1996 | Cuevas | 280/737 |
| 5,611,566 A | 3/1997 | Simon et al. | 280/736 |
| 5,613,705 A | 3/1997 | Hock et al. | 280/741 |
| 5,622,380 A | 4/1997 | Khandhadia et al. | 280/736 |
| 5,628,528 A | 5/1997 | DeSautelle et al. | 280/736 |
| 5,658,010 A | 8/1997 | Steffens, Jr. et al. | 280/741 |
| 5,685,558 A * | 11/1997 | Cuevas | 280/737 |
| 5,753,852 A * | 5/1998 | Bernau et al. | 102/530 |
| 5,794,973 A | 8/1998 | O'Loughlin et al. | 280/737 |
| 5,799,973 A | 9/1998 | Bauer et al. | 280/741 |
| 5,851,027 A | 12/1998 | DiGiacomo et al. | 280/736 |
| 5,863,066 A | 1/1999 | Blumenthal | 280/737 |
| 5,934,705 A | 8/1999 | Siddiqui et al. | 280/736 |
| 6,019,389 A | 2/2000 | Burgi et al. | 280/736 |
| 6,032,979 A | 3/2000 | Mossi et al. | 280/741 |
| 6,068,291 A * | 5/2000 | Lebaudy et al. | 102/217 |
| 6,095,556 A | 8/2000 | Bailey et al. | 280/737 |
| 6,095,561 A | 8/2000 | Siddiqui et al. | 280/742 |
| 6,139,055 A * | 10/2000 | Dahl et al. | 280/741 |
| 6,142,515 A * | 11/2000 | Mika | 102/531 |
| 6,149,193 A | 11/2000 | Canterberry et al. | 280/741 |
| 6,168,200 B1 * | 1/2001 | Greist et al. | 280/736 |
| 6,189,927 B1 * | 2/2001 | Mossi et al. | 280/736 |
| 6,199,906 B1 * | 3/2001 | Trevillyan et al. | 280/736 |
| 6,315,322 B1 * | 11/2001 | Mika | 280/736 |
| 6,364,353 B2 * | 4/2002 | Green et al. | 280/736 |
| 6,406,053 B1 * | 6/2002 | Bayer et al. | 280/736 |
| 6,412,815 B1 * | 7/2002 | Nakashima et al. | 280/736 |
| 6,422,601 B1 * | 7/2002 | Quioc | 280/741 |
| 6,474,684 B1 * | 11/2002 | Ludwig et al. | 280/741 |

FOREIGN PATENT DOCUMENTS

| | | | |
|---|---|---|---|
| DE | 42 27 547 A1 | 2/1994 | |
| DE | 196 20 758 A 1 | 11/1997 | |
| EP | 0 787 630 A 1 | 8/1997 | |
| WO | WO 99/33685 * | 7/1999 | B60R/21/26 |

* cited by examiner

*Primary Examiner*—Paul N. Dickson
*Assistant Examiner*—Joselynn Sliteris
(74) *Attorney, Agent, or Firm*—Dinnin & Dunn, P.C.

(57) ABSTRACT

A simplified multi-chamber inflator 10 utilizes a housing 12 having two initiator chambers 42 and 44 respectively formed within an initiator assembly 18. The initiator assembly 18 may be formed from a one-piece component or alternatively, may be formed by coupling a first component 26 and a second component 28 in nested relationship within the housing 12. A primary propellant chamber 52 fluidly communicates with initiator chambers 42 and 44 upon actuation of inflator 10.

8 Claims, 3 Drawing Sheets

MULTI-CHAMBER INFLATOR

CROSS-REFERENCE TO RELATED APPLICATIONS

This application claims the benefit of U.S. Provisional Application Serial No. 60/219,252 filed on Jul. 18, 2000. This application is also a continuation-in-part of U.S. application Ser. No. 09/568,719 filed May 11, 2000 now U.S. Pat. No. 6,422,601.

BACKGROUND OF THE INVENTION

The present invention relates to gas generators, used to inflate air bags in a vehicle occupant protection system for example, and more particularly, to an improved multiple chamber gas generator containing an improved structure for isolating the various chambers of a multi-chamber inflator so as to ensure proper deployment of the airbag.

Inflation systems for deploying an air bag in a motor vehicle generally employ a single gas generator in fluid communication with an uninflated air bag. A firing circuit typically triggers the gas generator when the sensed vehicle acceleration exceeds a predetermined threshold value, as through the use of an acceleration-responsive inertial switch.

However, air bag inflation systems utilizing a single gas generator suffer from the disadvantage that the onset pressurization/inflation rate is generally set to provide aggressive initial inflation in order to achieve a particular inflation time related to occupant position. An aggressive onset rate of pressurization becomes problematic in situations where the occupant is out of position. More specifically, rapid onset pressurization of the air bag can cause the air bag to impact against the occupant with enough force to injure the occupant. The airbag volume and inflating capacity are designed to protect both large and small occupants and are generally not variable within the single gas generator. Occasionally, when an air bag utilizing a single gas generator is deployed, smaller occupants, usually children and smaller women, have been seriously injured.

Commonly owned U.S. Pat. No. 5,400,487 discloses an inflation system which overcomes the above problem by utilizing a plurality of gas generators which are controllably ignited to provide a variable inflation profile which can be tailored to any given occupant weight and/or position and for any crash type. While this arrangement dramatically improves the inflation system's ability to protect an occupant, it does so at significant expense and complexity. The multiple gas generators and squibs add considerable cost to the system, while the firing control circuitry requires sophisticated processors capable of accurately timing the various ignition profiles.

Another proposal, as taught in commonly owned U.S. Pat. No. 5,934,705, is a gas generator having two chambers in a single housing defined by a mechanically retained wall between the ends thereof. Each housing is of a predetermined size that is determinative of the propellant capacity and consequently, of the inflating capability of each chamber. Upon the occurrence of a vehicle collision, depending on the weight of the passenger, either chamber or both may be selectively ignited thereby inflating the protective airbag. However, this design appears to accommodate passenger-side inflators only.

In sum, typical multi-chamber inflators often require a more robust design, resulting in relatively higher costs and more complicated manufacturing as compared to a single chamber inflator.

Therefore, a need exists for a dual chamber gas generator that exhibits a simplified design, simplified manufacturing, and therefore lower material and manufacturing costs, and yet can still produce selective air bag inflation pressurization without hazardous structural failure of the gas generator.

SUMMARY OF THE INVENTION

The above-referenced concerns are resolved by the present invention. Complete isolation of the chambers of a multi-chamber airbag inflator is critical to soft deployment of the airbag. Therefore, the present invention relates to an improved structure for isolating the ignition chambers of a multi-chamber inflator so as to insure proper deployment. Specifically, a cup shaped housing contains a primary propellant chamber and also a two-section igniter assembly containing two ignition chambers therein. The igniter assembly is employed to define the multiple chambers of the inflator and positively isolate the propellants therein. Although a two-section ignition assembly is shown in the drawings, it should be appreciated that a single section assembly containing the ignition chambers formed therein is also contemplated.

The inflator can be configured to ignite the ignition propellants in the dual ignition chambers individually, simultaneously or with a delay between ignition depending on the severity of the crash. The main gas generant charge is located in a primary chamber within the housing. Upon inflator operation, the first and/or second ignition chambers fluidly communicate with the primary chamber thereby combusting the main gas generant composition.

DETAILED DESCRIPTION OF THE PREFERRED EMBODIMENT OF THE INVENTION

Figure 1:
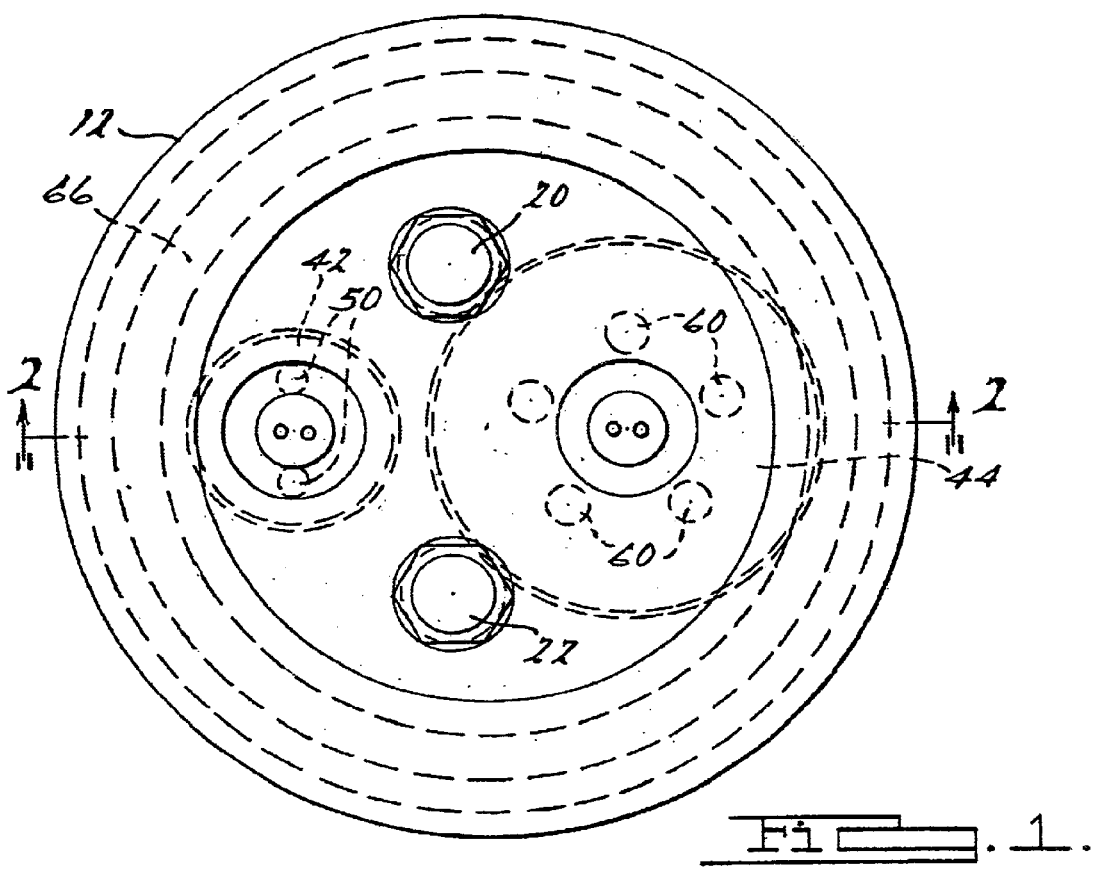
FIG. 1 is a cross-sectional top view of a two-chamber inflator in accordance with the present invention.
Figure 2:
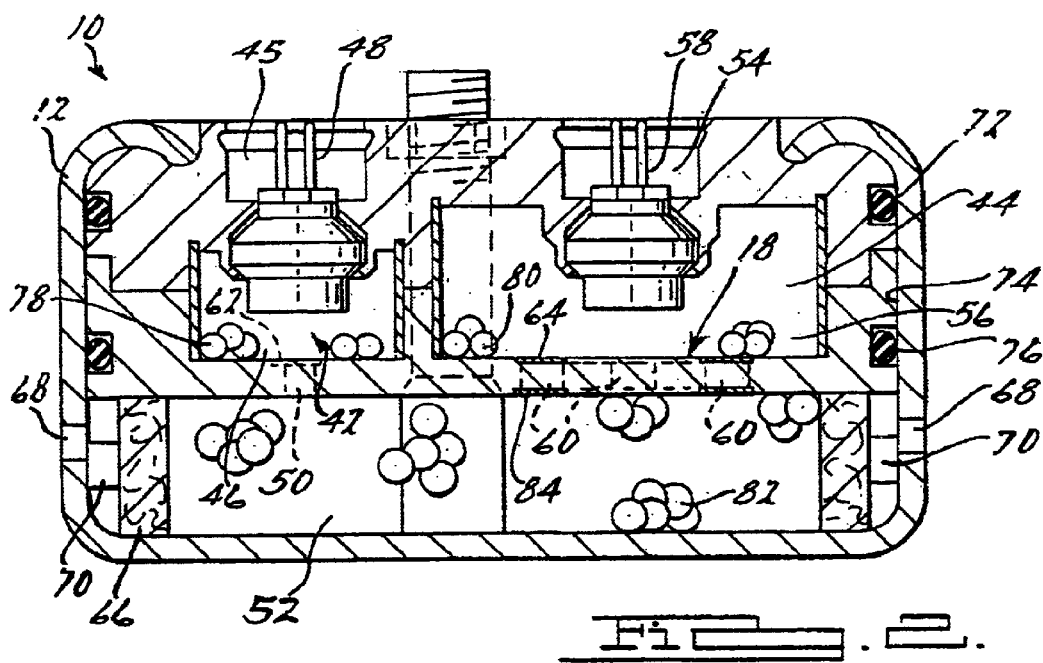
FIG. 2 is a cross-sectional view taken along the line 2—2 of FIG. 1.
Figure 3:
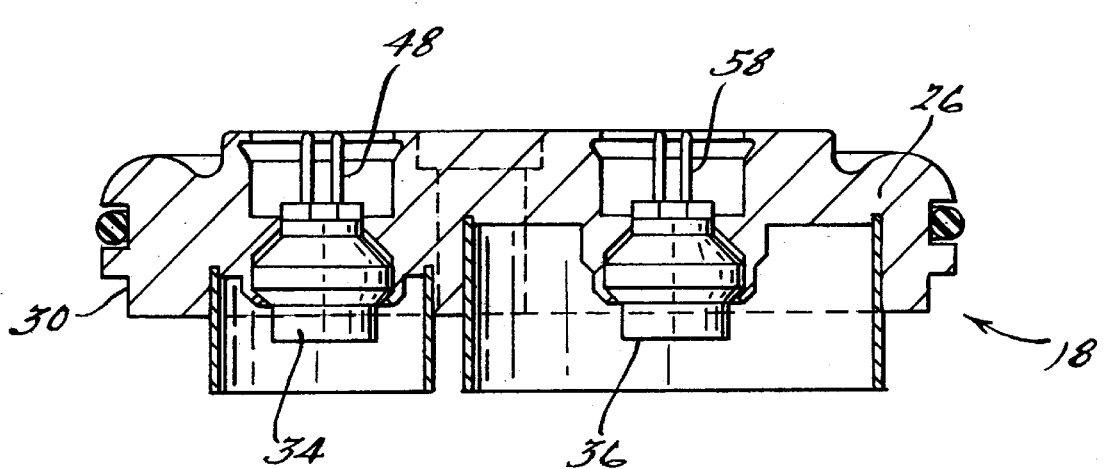
FIG. 3 is a view of the inflator prior to finished assembly.
Figure 3:
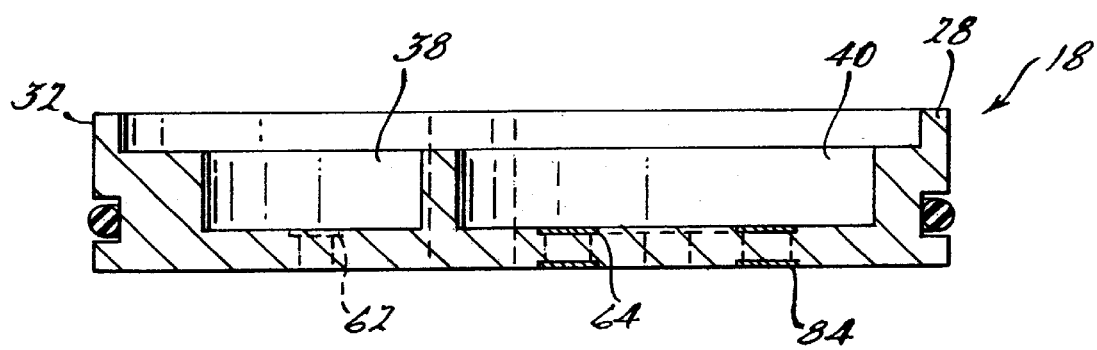
Figure 3:
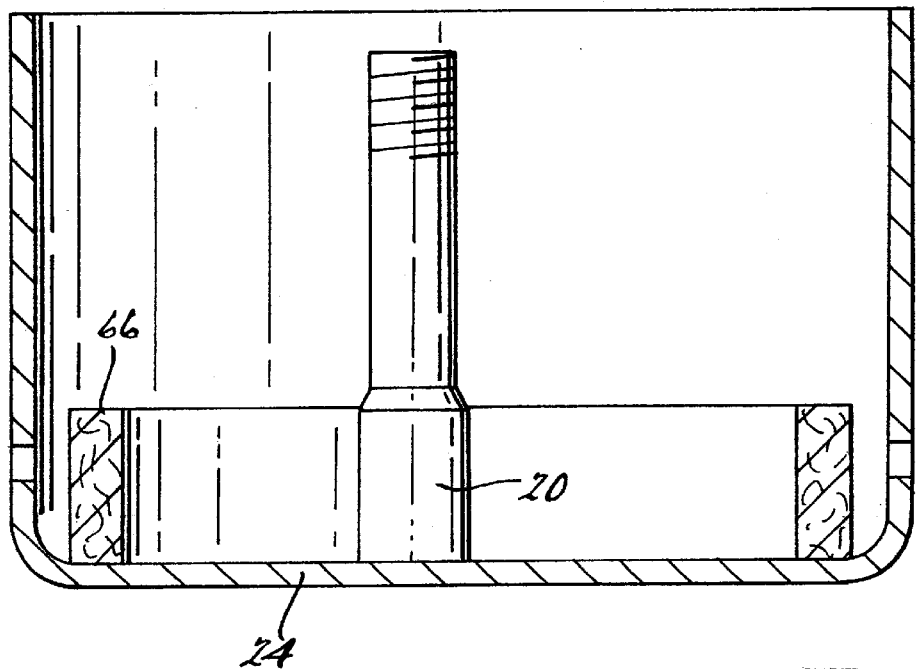

As seen in FIG. 1 of the drawings, an inflator 10, in accordance with a preferred embodiment of the present invention, contains a housing 12, a two-section igniter assembly 18 centrally disposed of the housing 12 and defining dual ignition chambers 42 and 44, a pair of igniters 48 and 58, and an annular filter 66. Alternatively, the igniter assembly 18 may simply be die-cast, extruded, or formed into a one-piece ignition assembly 18a wherein the two ignition chambers 42 and 44 remain integral thereto.

The inflator housing or monolith 12 may be formed from a metal cast or extrusion, or a polymeric mold, or by other known methods and materials. Support standoffs 20 and 22 are welded to the bottom 24 of housing 12 and secured by locknut to the igniter assembly 18, whereby the support standoffs strengthen the structural integrity of the inflator 10. If desired, the two-piece ignition assembly 18 may be formed by bonding or press-fitting two sections 26 and 28 to one another in nested relationship. The first section 26 contains an aperture 30 for the acceptance or coupling of a protrusion 32 of the section 28. Sections 26 and 28 are formed by stamping or molding a suitable substrate such as, but not limited to steel, aluminum, or polymer.

First section 26 is preferably extruded from aluminum and contains a first open-ended annulus 34 and a second open-ended annulus 36. Second section 28 is also preferably extruded from aluminum and contains a third annulus 38 and a fourth annulus 40, wherein the third and fourth annuli are open at their respective proximate ends 39 and are substantially but not completely closed at their respective distal ends 41.

Figure 4:
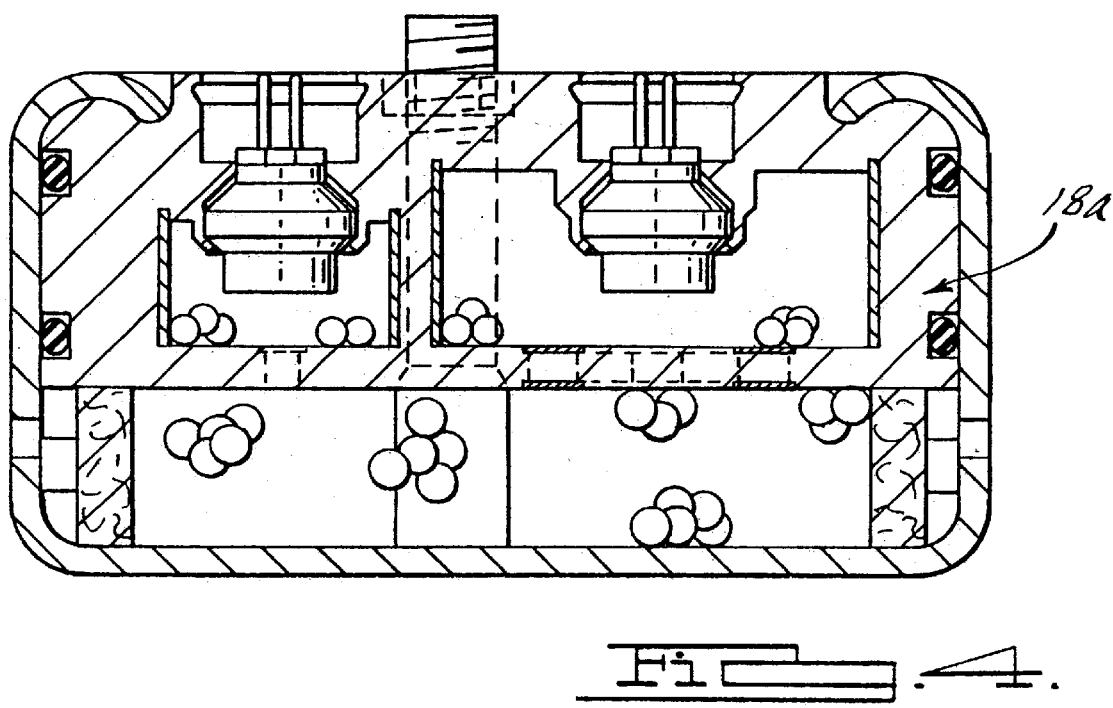
FIG. 4 is a view of the inflator having a one-piece igniter assembly rather than a two-piece igniter assembly.

As shown in the Figures, a first igniter chamber 42 is formed when the first and third annuli or the first and third annular walls, substantially equal in circumference, are axially aligned upon joining of the sections 26 and 28. Correspondingly, a second igniter chamber 44 is formed when the second and fourth annuli or second and fourth annular walls, also substantially equal in circumference, are axially aligned upon joining of the sections 26 and 28. As shown in the Figures, chamber 42 indicates a smaller circumference than chamber 44, but is not thereby limited. Casting a one-piece ignition assembly 18a, as shown in FIG. 4, as opposed to the two-piece ignition assembly 18 more readily forms chambers 42 and 44. However, it may be desirable to incorporate a two-piece or two-component ignition assembly given that the benefits of various materials may be combined in the two components 26 and 28. For example, the first component 26 may be formed from steel to enhance the structural integrity of the inflator 10, while the second component 28 may be formed from aluminum thereby decreasing the overall weight of the inflator.

Chamber 42 contains a proximate end 45 and a distal end 46. A first igniter 48 is inserted through the proximate end 45 and is thereby disposed within chamber 42. Igniter 48 is then preferably crimped to section 26. A first plurality of gas exit apertures 50 extend through distal end 46 thereby facilitating fluid communication between chamber 42 and a primary propellant or primary gas generant chamber 52.

Chamber 44 contains a proximate end 54 and a distal end 56. A second igniter 58 is inserted through the proximate end 54 and is thereby disposed within chamber 44. Igniter 58 is then preferably crimped to section 26. A second plurality of gas exit apertures 60 extends through distal end 56 thereby facilitating fluid communication between chamber 44 and the primary gas generant chamber 52.

A first aluminum shim 62 preferably covers apertures 50 thereby sealing chamber 42. A second aluminum shim 64 covers apertures 60 thereby sealing chamber 44.

An annular filter 66 is peripherally and radially spaced from a central axis of chamber 52. As shown in the Figures, the primary propellant chamber 52 is formed when the ignition assembly 18 is placed atop the filter 66 within the housing 12.

A third plurality of gas exit apertures 68 are circumferentially disposed within the housing 12 and about the chamber 52, thereby providing fluid communication between the chamber 52 and an airbag (not shown). A plurality of burst shims 70 correspond to and cover each aperture in the third plurality of apertures 68, thereby sealing chamber 52.

A first O-ring or seal 72 preferably seals the interface between the first section 26 and an inner wall 74 of the housing 12. A second O-ring or seal 76 preferably seals the interface between the second section 28 and the inner wall 74.

A first ignition compound or initiator composition 78 is provided within the first chamber 42. A second initiator composition 80, the same as or different from composition 78, is provided within the second chamber 44. A primary propellant or gas generant composition 82 is provided within the chamber 52.

To join the various subassemblies, the filter 66 is first inserted within the housing 12. The propellant 82 is then inserted into chamber 52. A complete igniter assembly 18 is then loaded atop the filter 66 within the housing 12. Housing 12 is then circumferentially crimped over the first section 26 thereby sealing the inflator 10. Manufacture is thus simplified by minimizing the number of weld points required.

In operation, a vehicle occupant protection system generates a signal indicating sudden deceleration or a crash event that is then sensed by igniter 48 thereby triggering ignition of the first initiator propellant 78. Upon ignition of composition 78, the combustion gases create a pressure that ruptures the first aluminum shim 62. Heat, flame, and gases then flow from chamber 42 into chamber 52 thereby igniting the main propellant charge 82. Combustion pressure then ruptures burst shims 70 whereby gases then flow from chamber 52 through filter 66, then through apertures 68, and into an airbag. The second ignition chamber 44 operates in the same way relative to its respective components, in either parallel or independent operation of the first chamber 42.

The second chamber 44 is selectively operative based on factors such as crash severity, occupant position sensing, and the weight and/or height of the occupant. Therefore, a shield 84 (preferably made from stainless steel) further covers apertures 60 thereby functioning as a heat and pressure shield. Shield 84 thus prevents inadvertent or undesirable ignition of the second initiator composition 80 caused by flame front, gas, and heat propagation within chamber 52.

It will be appreciated, however, that chambers 42 and 44 may be operated simultaneously, individually operated, or within a timed interval of each other. For example, chamber 42 may be singularly initiated in lieu of chamber 44, given a minimal weight of the occupant. Shield 84 thus preserves independent operation of each chamber but does not inhibit or delay the simultaneous operation of each chamber if desired.

The wire mesh filter 66 can be formed from multiple layers or wraps of metal screen, for example. Although not limited thereby, U.S. Pat. Nos. 6,032,979 and 5,727,813, herein incorporated by reference, illustrate typical metal filters. Other features of the present invention are well known in the art. For example, but not by way of limitation, the propellant or gas generant composition and the ignition compounds may be formulated as described in co-owned U.S. Pat. No. 5,035,757, herein incorporated by reference.

It will be understood that the foregoing description of the preferred embodiment of the present invention is for illustrative purposes only. As such, the various structural and operational features herein disclosed are susceptible to a number of modifications commensurate with the abilities of one of ordinary skill in the art, none of which departs from the scope of the present invention as described above and as defined in the appended claims.

What is claimed is:

1. An inflator for a vehicle occupant protection system comprising:
   a housing comprising an inner wall and a first plurality of gas exit apertures spaced therein, said housing forming a primary propellant chamber;
   an initiator assembly comprising a first component and a second component coupled together in nested relationship, said assembly fixed within said housing and over said primary propellant chamber;
   a first chamber and a second chamber wherein each chamber is formed through said first and second components, said first chamber and/or said second chamber in fluid communication with said primary propellant chamber upon inflator operation;

a first initiator and a second initiator contained within the first chamber and the second chamber respectively;

a first ignition compound and a second ignition compound within said first and second chambers respectively, wherein upon inflator operation said first and/or said second initiators ignite said first and/or said second ignition compounds, respectively; and a solid primary gas generant composition contained within said primary propellant chamber, said primary gas generant combustible upon ignition of said first and/or said second ignition compounds wherein gases produced from said primary gas generant exit said first plurality of gas exit apertures.

2. The inflator of claim 1 further comprising an annular filter circumferentially juxtaposed to the inner wall of said housing.

3. An inflator for a vehicle occupant protection system comprising:

a housing containing a primary propellant chamber formed therein;

an ignition assembly fixed within said housing, the ignition assembly comprising a first component and a second component coupled together in nested relationship;

a first annular wall and a second annular wall formed within said first component;

a third annular wall and a fourth annular wall formed within said second component, said first and third walls circumferentially equivalent and in axial alignment, and said second and fourth walls circumferentially equivalent and in axial alignment, wherein said first and third walls form a first ignition chamber and said second and fourth walls form a second ignition chamber;

a first igniter contained within the first ignition chamber;

a second igniter contained within the second ignition chamber;

a first ignition compound contained within said first ignition chamber and ignitable by said first igniter wherein said first chamber fluidly communicates with said primary chamber upon ignition of said first ignition compound; and a second ignition compound contained within said second ignition chamber and ignitable by said second igniter wherein said second chamber fluidly communicates with said primary chamber upon ignition of said second ignition compound; and a primary gas generant composition contained within said primary propellant chamber, said primary gas generant combustible upon ignition of said first and/or said second ignition compounds.

4. A gas generating inflator useful in a vehicle occupant protection system comprising:

a housing containing a primary propellant chamber formed therein;

an ignition assembly comprising a first ignition chamber and a second ignition chamber formed therein, said first ignition chamber and said second ignition chamber positively isolated during inflator operation;

a first igniter contained within the first ignition chamber;

a second igniter contained within the second ignition chamber;

a first ignition compound contained within said first ignition chamber and ignitable by said first igniter wherein said first chamber fluidly communicates with said primary chamber upon ignition of said first ignition compound; and a second ignition compound contained within said second ignition chamber and ignitable by said second igniter wherein said second chamber fluidly communicates with said primary chamber upon ignition of said second ignition compound; and a solid primary gas generant composition contained within said primary propellant chamber, said primary gas generant combustible upon ignition of said first or said second ignition compounds, and, said inflator operable upon ignition of either the first or second ignition compound.

5. The inflator of claim 4 wherein said ignition assembly comprises a one-piece extrusion.

6. A gas generating inflator useful in a vehicle occupant protection system comprising:

a housing containing a primary propellant chamber formed therein;

an ignition assembly formed from a first component in nested relationship with a second component, said ignition assembly comprising a first ignition chamber and a second ignition chamber formed therein;

a first igniter contained within the first ignition chamber;

a second igniter contained within the second ignition chamber;

a first ignition compound contained within said first ignition chamber and ignitable by said first igniter wherein said first chamber fluidly communicates with said primary chamber upon ignition of said first ignition compound; and a second ignition compound contained within said second ignition chamber and ignitable by said second igniter wherein said second chamber fluidly communicates with said primary chamber upon ignition of said second ignition compound; and a solid primary gas generant composition contained within said primary propellant chamber, said primary gas generant combustible upon ignition of said first and/or said second ignition compounds.

7. A gas generating inflator useful in a vehicle occupant protection system comprising:

a housing containing a primary propellant chamber formed therein;

a single ignition assembly comprising a first annular wall and a second annular wall, said first annular wall and said second annular wall respectively defining a first ignition chamber and a second ignition chamber;

a first igniter contained within the first ignition chamber; a a second igniter contained within the second ignition chamber;

a first ignition compound contained within said first ignition chamber and ignitable by said first igniter wherein said first chamber fluidly communicates with said primary chamber upon ignition of said first ignition compound; and a second ignition compound contained within said second ignition chamber and ignitable by said second igniter wherein said second chamber fluidly communicates with said primary chamber upon ignition of said second ignition compound; and a solid primary gas generant composition contained within said primary propellant chamber, said primary gas generant combustible upon ignition of said first and/or said second ignition compounds.

8. The inflator of claim 7 wherein said ignition assembly comprises a one-piece extrusion.

* * * * *

UNITED STATES PATENT AND TRADEMARK OFFICE
CERTIFICATE OF CORRECTION

PATENT NO. : 6,659,500 B2
DATED : December 9, 2003
INVENTOR(S) : David S. Whang et al.

It is certified that error appears in the above-identified patent and that said Letters Patent is hereby corrected as shown below:

<u>Column 6,</u>
Line 55, delete "a" after -- chamber; --.

Signed and Sealed this

Thirteenth Day of April, 2004

JON W. DUDAS
*Acting Director of the United States Patent and Trademark Office*